United States Patent
Netzer et al.

[11] Patent Number: 6,164,659
[45] Date of Patent: Dec. 26, 2000

[54] PISTON ROD SEAL

[75] Inventors: Jürgen Netzer, Burscheid; Siegfried Pietsch, Leverkusen; Bernd Stephan, Remscheid-Lennep, all of Germany

[73] Assignee: CR Elastomere GmbH, Leverkusen, Germany

[21] Appl. No.: 09/104,393

[22] Filed: Jun. 25, 1998

[30] Foreign Application Priority Data

Jun. 25, 1997 [DE] Germany .......................... 197 26 997

[51] Int. Cl.$^7$ ...................................... F16J 9/20
[52] U.S. Cl. ...................... 277/437; 277/438; 277/439; 277/468; 277/909; 188/322.18
[58] Field of Search ...................... 277/435, 437, 277/438, 468, 439, 491, 530, 456, 572, 549, 909; 188/322.17, 322.18

[56] References Cited

U.S. PATENT DOCUMENTS

| | | |
|---|---|---|
| 2,765,877 | 10/1956 | Bourcier de Carbon . |
| 3,227,497 | 1/1966 | Heckethorn . |
| 3,848,880 | 11/1974 | Tanner . |
| 4,044,866 | 8/1977 | Ishida ........................................ 188/322 |
| 4,274,517 | 6/1981 | Kato et al. ................................ 188/315 |
| 4,491,160 | 1/1985 | Axthammer et al. .................... 141/349 |
| 4,750,594 | 6/1988 | Siemann et al. ...................... 188/322.17 |
| 5,127,497 | 7/1992 | Struckmeyer et al. .............. 118/322.17 |
| 5,176,229 | 1/1993 | Kanari et al. ........................ 188/322.17 |
| 5,178,243 | 1/1993 | Hamada et al. ..................... 188/322.17 |
| 5,477,949 | 12/1995 | Forster et al. ....................... 188/322.17 |

FOREIGN PATENT DOCUMENTS

| | | |
|---|---|---|
| 0 208 839 | 11/1989 | European Pat. Off. . |
| 1 425 559 | 1/1969 | Germany . |
| 23 32 869 | 4/1977 | Germany . |
| 84 14 741.5 | 8/1984 | Germany . |
| 1 109 968 | 6/1991 | Germany . |
| 4216573 | 11/1993 | Germany . |
| 42 25 556 | 5/1995 | Germany . |

*Primary Examiner*—Anthony Knight
*Assistant Examiner*—Alison K. Pickard
*Attorney, Agent, or Firm*—Burns, Doane, Swecker & Mathis, L.L.P.

[57] ABSTRACT

A piston rod seal includes a sealing disk provided with a reinforcement element, a guide mechanism, and a support piece which are adapted to be placed consecutively in a metal pipe or similar object functioning as a housing, and which are adapted to surround a piston rod when installed. To create a seal having relatively few components and a relatively small axial dimension, the reinforcement element is connected to the sealing disk and is constructed to function as a guide element for guiding the axial movement of the piston rod.

15 Claims, 5 Drawing Sheets

PISTON ROD SEAL

This application corresponds to and claims priority under 35 U.S.C. § 119 with respect to German Application No. P 197 26 997.4 filed on Jun. 25, 1997, the entire content of which is incorporated herein by reference.

FIELD OF THE INVENTION

The present invention generally relates to seals. More particularly, the present invention pertains to a piston rod seal for surrounding a piston rod when installed.

BACKGROUND OF THE INVENTION

As disclosed in German Gebrauchsmuster No. G 84 14 741, it is known in the art to provide a piston rod seal with guide elements. The piston rod seal includes a sealing disk provided with a reinforcement ring, a guide element, and a support piece. These piston rod seals are comprised of three separate parts which are placed in a metal pipe and held in place by a flange provided at one end of the pipe and a circumferential bead in the pipe. This known design with its many components is quite expensive to manufacture and also possesses a relatively long axial dimension.

In light of the foregoing, a need exists for a piston rod seal unit having a smaller axial dimension and possessing fewer components so as to be less expensive to produce.

SUMMARY OF THE INVENTION

According to the present invention, the reinforcement element of the piston rod seal is connected to the sealing disk and is simultaneously constructed as a guide element for the piston rod. This reduces the number of components forming the piston rod seal.

According to one aspect of the present invention, a piston arrangement includes a housing having an inner surface, a piston rod positioned within the housing for axially moving within the housing, and a piston rod seal mounted in surrounding relation on the piston rod and located within the housing for providing a seal between the outer surface of the piston rod and the inner surface of the housing. The piston rod seal includes a sealing disk to which is connected a reinforcement element, with reinforcement element functioning as a guide element that guides the piston rod during axial movement of the piston rod.

In accordance with another aspect of the present invention, a piston rod seal for providing a seal between a housing and an axially movable piston rod positioned within the housing includes a sealing disk having an outer surface and guiding means for guiding movement of the piston rod during axial movement of the piston rod within the housing. The guiding means is in the form of a reinforcement element that is connected to the sealing disk and arranged axially with respect to the sealing disk.

The reinforcement element functioning as a guide element may be constructed as a flat disk that surrounds the piston rod with only a slight play. Alternatively, the reinforcement element functioning as a guide element may be constructed as an angled ring having a radially directed leg carrying the sealing disk and an axially directed leg surrounding the piston rod; or as a generally U-shaped ring element possessing two axially directed legs, with one of the axially extending legs functioning as a centering surface for the seal inside the housing. The leg surrounding the piston rod with play enlarges the guide surface for the piston rod, thus safely preventing tilting. The reinforcement element can also be constructed as a z-shaped element in which the radially outer and axially extending leg functions as the support piece, thus further reducing the number of components of the piston rod seal.

According to another characteristic of the present invention, the bore of the reinforcement element can be provided with a layer of a friction-reducing material to enable sliding of the piston rod without stick slip. Also, to ensure a relatively perfect seal between the piston rod seal and the housing and to avoid penetration of fluid or gas, another characteristic of the present invention involves providing the outer surface of the reinforcement element with a layer of elastomer material. The elastomer material used for this purpose is preferably the same material that is used for fabricating the sealing disk.

BRIEF DESCRIPTION OF THE DRAWING FIGURES

The foregoing and additional features will become more apparent from the following detailed description considered with reference to the accompanying drawing figures in which like elements are designated by like reference numerals and wherein:

FIG. 1 is a cross-sectional view of the end of a gas spring illustrating the piston rod, the piston, and the piston rod seal;

FIG. 2 cross-sectional view similar to FIG. 1 illustrating a different embodiment of the piston rod seal;

DETAILED DESCRIPTION OF THE INVENTION

Figure 1:
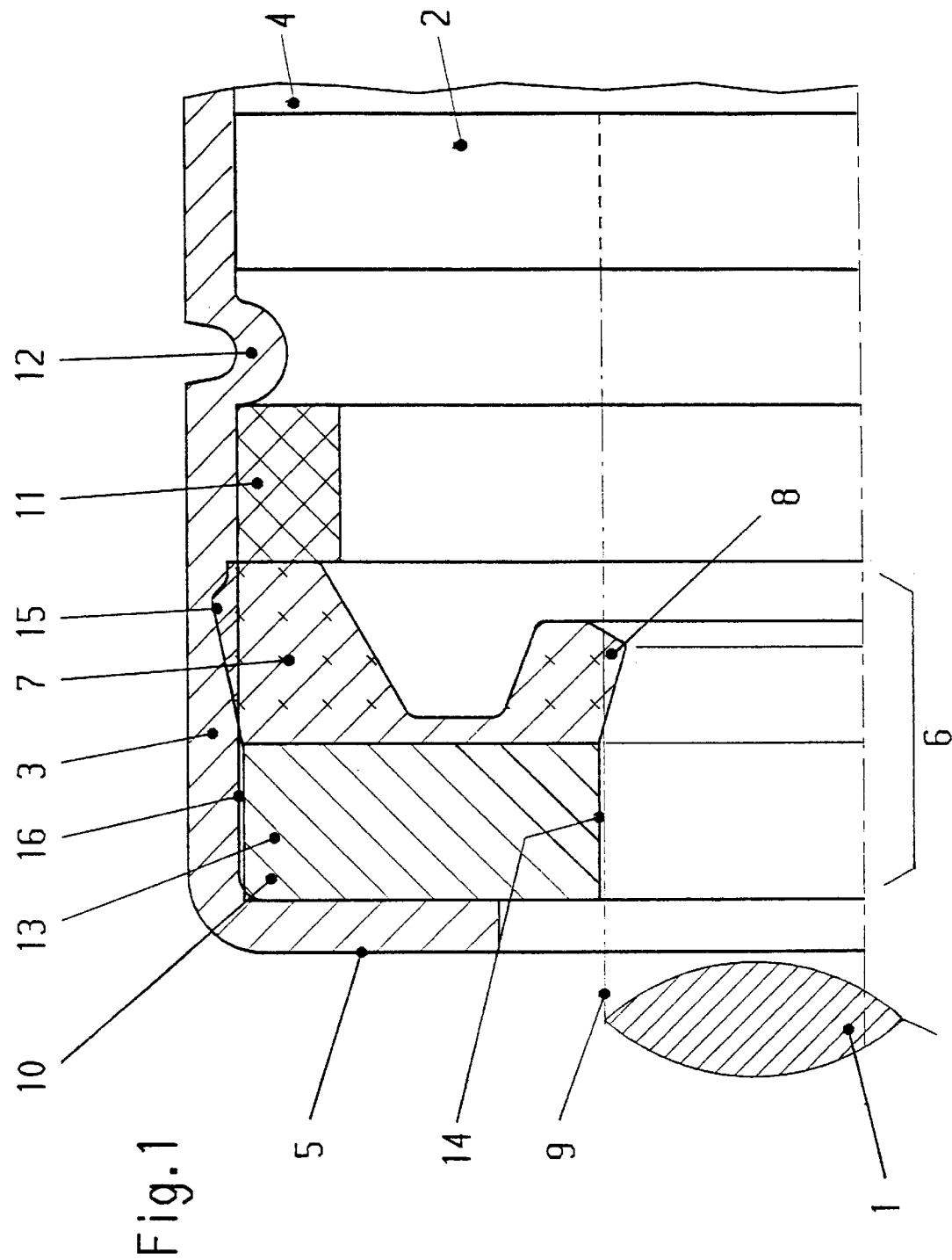

With reference initially to FIG. 1, the piston rod exit end of a gas spring is shown. The piston rod 1 is illustrated in dotted outline and a piston 2 is connected to the piston rod 1. The piston 2 is guided in a thin-walled housing or pipe 3 made from sheet metal. The interior 4 of the pipe 3 is filled with pressurized gas. The pipe 3 is provided with a radially inwardly flanged edge 5 which forms an inner support surface for the piston rod seal 6.

This piston rod seal 6 is generally defined by a sealing disk 7 and a connected reinforcement element 10. The sealing disk 7 is made from an elastomeric material (normally rubber or another suitable elastomeric material) possessing good sealing properties and is adapted to slide in a sealing manner within the pipe 3. The sealing disk 7 is provided with a radially inwardly directed inner sealing lip 8. FIG. 1 illustrates the configuration of the inner sealing lip 8 when the piston rod seal 6 is in the non-installed state. The inner sealing lip 8 possesses an inner diameter that is smaller than the outer diameter of the piston rod 1. When the piston rod seal 6 is installed within the pipe 3 and mounted in surrounding relation to the piston rod 1, the inner sealing lip 8 of the sealing disk 7 is positioned in contacting engagement with the outer surface 9 of the piston rod 1 to provide an effective seal with the outer surface of the piston rod.

The sealing disk 7 is also provided with an outer sealing lip 15. FIG. 1 illustrates the configuration of the outer sealing lip 15 prior to installation of the piston rod seal 6 within the pipe 3 and on the piston 1. In the uninstalled state shown in FIG. 1, the outer sealing lip 15 forms a radially outwardly projecting element. The outer sealing lip 15 possesses an outer diameter that is greater than the inner diameter of the bore 16 in the housing 3. With the piston rod seal 6 in the installed state within the housing 3 in surrounding relation to the piston rod 1, the projecting outer sealing lip 15 rests with a preload against the inside surface 16 of the housing 3 and thus forms a static seal with the inner surface of the housing 3.

The piston rod seal 6 is axially fixed within the pipe 3 by virtue of a support piece 11 located at one end of the piston rod seal 6. The support piece 11 is axially retained in place by a bead 12 extending radially inwardly within the pipe 3. The opposite end of the piston rod seal 6 bears against the radially inwardly directed flange 5 that is formed at the end of the pipe 3. The reinforcement element 10, the elastomeric sealing disk 7 and the support piece 11 are consecutively axially arranged on the piston rod 1 and within the housing 3 as seen in FIG. 1.

Figure 5:
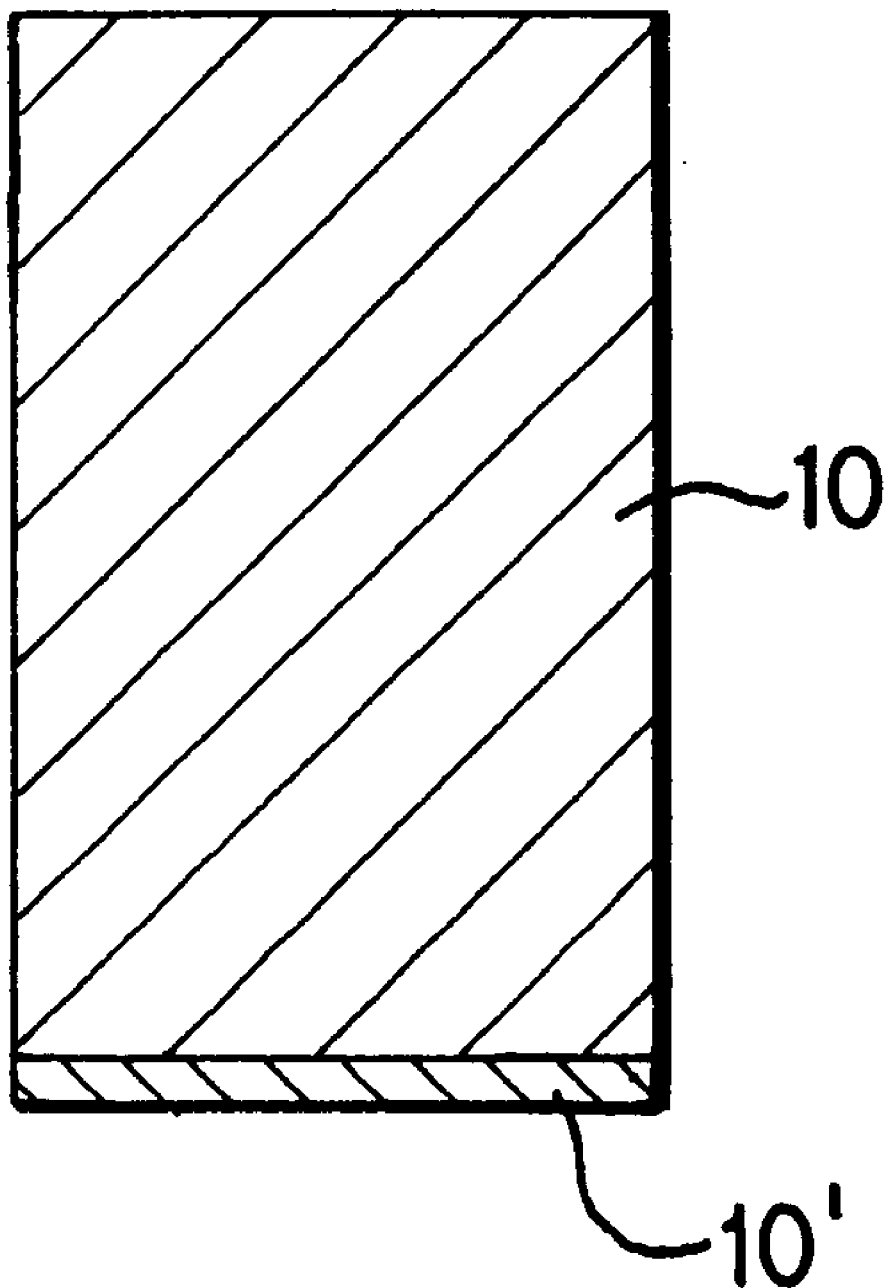
FIG. 5 is a cross-sectional view of the reinforcement element illustrating the layer of friction reducing material applied to the inner surface of the bore.

The reinforcement element 10 that is connected to the sealing disk 7 is made from metal or a similar material. Thus, the reinforcement element 10 and the sealing disk 7 are preferably made of different materials, with the two being connected by, for example, glue bonding or vulcanization. The reinforcement element 10 reinforces the compressible or elastic sealing disk 7, thus imparting sufficient stiffness to the piston rod seal 6. In this embodiment, the reinforcement element 10 is constructed as a disk 13 having a bore 14 that surrounds the outer surface 9 of the piston rod 1 with a slight radial play. The reinforcement element 10 advantageously serves as a guide that guides the piston rod 1 during axial movement of the piston rod 1 within the housing 3. The inner surface of the bore 14 in the reinforcement element can be provided with a layer 10' of friction reducing material, as seen in FIG. 5, to facilitate the axial movement of the piston rod 1 within the bore 14 as the reinforcement element 10 guides the piston rod 1.

Figure 2:
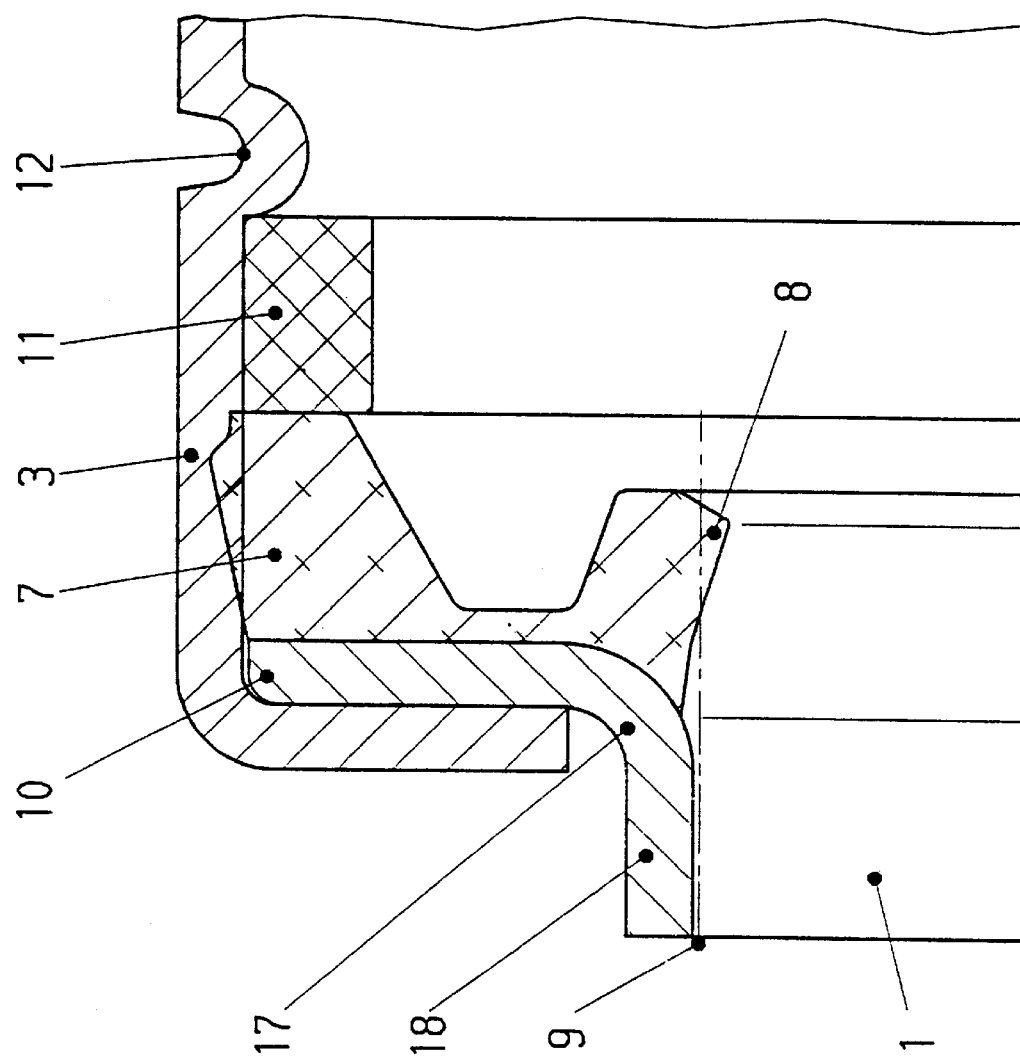

A second embodiment of the present invention shown in FIG. 2 differs from the first embodiment described above and illustrated in FIG. 1 insofar as the configuration of the reinforcement element 10. In the FIG. 2 embodiment, the reinforcement element 10 is constructed as an angled ring 17 having an axially extending portion or leg 18 that extends from a radially extending portion or leg of the ring 17. The radially extending portion of the angled ring 17 is located between the sealing disk 7 and the radially inwardly located flange 5 of the ends of the housing 3. The axially extending leg 18 of the ring 17 surrounds the piston rod 1 with a slight radial play. This axially extending leg 18 of the ring 17 significantly increases the guide length associated with the piston rod seal. The inner surface of the axially extending portion 18 can be provided with a layer of friction-reducing material, similar to that shown in FIG. 5, to facilitate the axial movement of the piston rod 1 within the axially extending portion 18 as the axially extending portion 18 of the reinforcement element 10 guides the piston rod 1.

Figure 3:
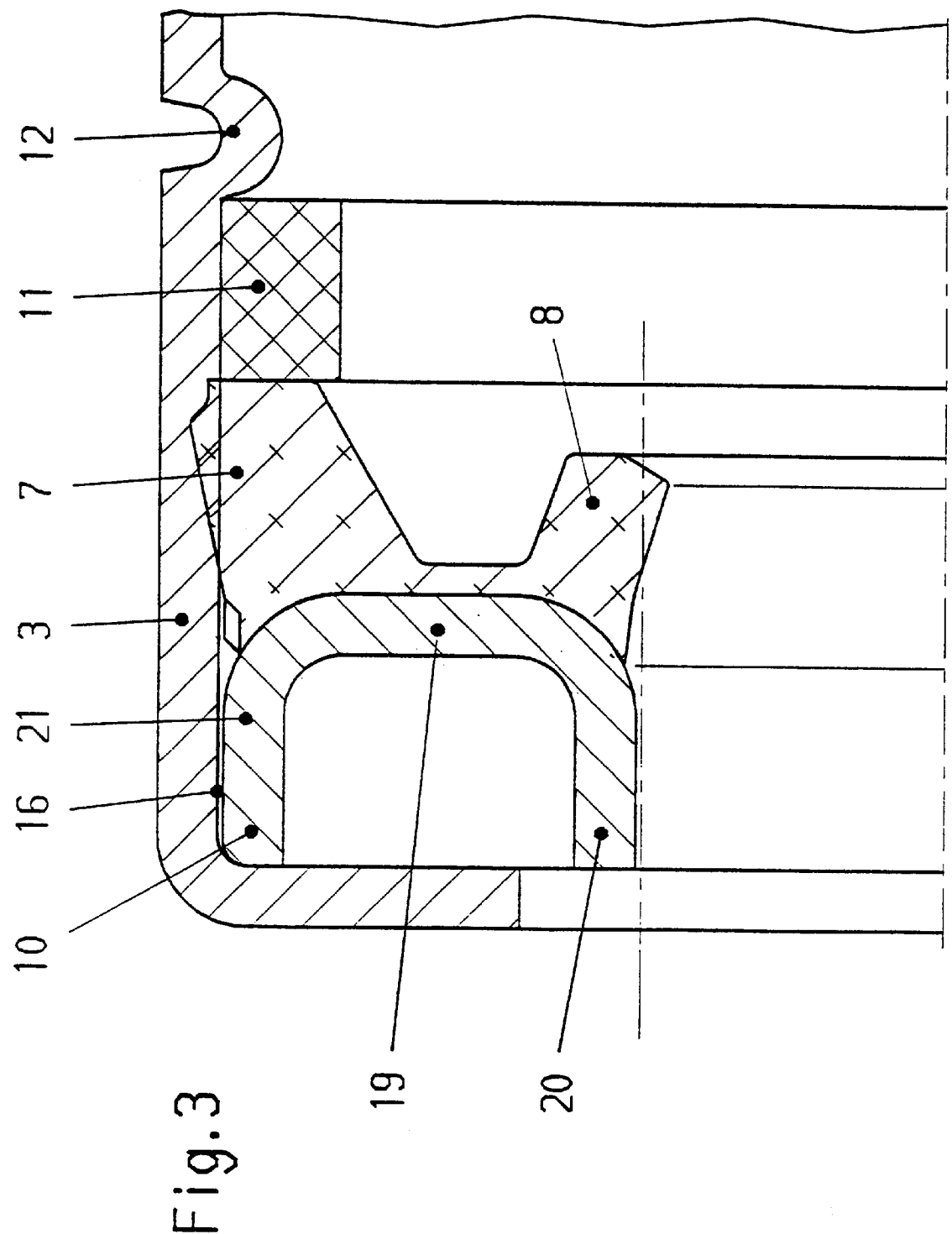
FIG. 3 is a cross-sectional view similar to FIG. 1 illustrating another embodiment of the piston rod seal.

Another embodiment of the present invention is shown in FIG. 3. In this embodiment, the reinforcement element 10 is constructed as a U-shaped ring element 19 possessing two generally parallel legs 20, 21. The legs 20, 21 extend in the same axial direction, with the radially innermost leg 20 surrounding the outer surface of the piston rod 1 with a slight radial play. The radially outermost leg 21 of the ring element centers the seal 7 within the bore or inner surface 16 of the pipe 3. The inner surface of the inner leg 20 can be provided with a friction reducing material, similar to that illustrated in FIG. 5, to facilitate the axial movement of the piston rod 1 within the inner leg 20 of the reinforcement element 10 as the inner leg 20 guides the piston rod 1. Also, to avoid metallic contact between the radially outermost leg 21 and the bore 16, a layer of elastomeric material can be provided on the outer surface of the leg 21.

Figure 4:
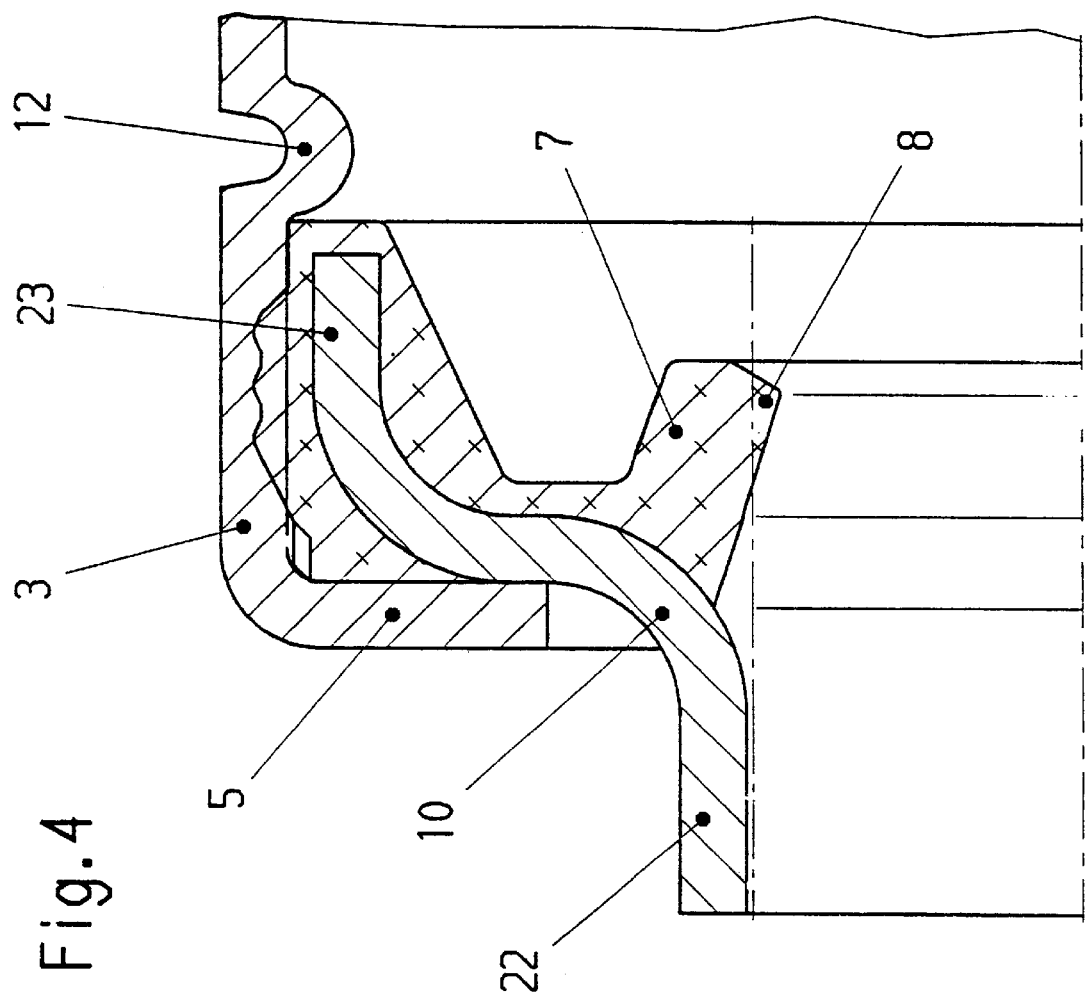
FIG. 4 is a cross-sectional view similar to FIG. 1 illustrating a further embodiment of the piston rod seal.

In a still further embodiment of the present invention shown in FIG. 4, the reinforcement element 10 is configured to possess a z-shaped cross-sectional configuration with two generally parallel legs 22, 23 extending in axially opposite directions. The leg 23 that extends away from the radially inwardly directed flange 5 is locate d radially outwardly of the other leg 22. The radially innermost leg 22 surrounds the piston rod 1 with play as seen in FIG. 4 while the radially outermost leg 23 functions as a support for the piston rod seal 6 in the pipe 3. Thus, the additional support part provided by the support piece 11 in the embodiments shown in FIGS. 1–3 is not necessary. The radially outermost leg 23 of the reinforcement element 10 is imbedded in the elastomer sealing ring 7 to create a static seal between the piston rod seal 6 and the inner surface of the pipe 3. The inner surface of the radially innermost leg 22 can be provided with a layer of friction reducing material, in a manner similar to that shown in FIG. 5, to facilitate the axial movement of the piston rod 1 within the inner leg 22 as the leg 22 guides the movement of the piston rod 1.

In each of the embodiments described above and illustrated in FIGS. 1–4, the sealing disk 7 defining a portion of the piston rod seal is configured in the same manner as that described above with reference to FIG. 1. That is, in each of the embodiments, the sealing disk 7 possesses an inner sealing lip 8 that is directed radially inwardly in the uninstalled state of the piston rod seal 6 and rests against the outer surface of the piston rod 1 in the installed state of the piston rod seal, and an outer sealing lip 15 that is directed radially outwardly in the uninstalled state of the piston rod seal 6 and rests against the inner surface of the pipe 3 in the installed state of the piston rod seal.

The piston rod seal according to the present invention provides an effective seal between the outer surface of the piston rod and the inner surface of the pipe or tubular element in which the piston rod is located, yet is less complicated in construction as compared to other piston rod seals because it requires less parts. quite advantageously, the reinforcement element functions as a guide element that guides the axial movement of the piston rod. The piston rod seal is thus less expensive from a manufacturing standpoint. Further, the piston rod seal of the present invention advantageously possesses a relatively small axial dimension as compared to other known piston rod seals.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A piston arrangement comprising:

a housing having an inner surface;

a piston rod positioned within the housing for axially moving within the housing, the piston rod having an axis and an outer surface; and a piston rod seal mounted in surrounding relation on the piston rod and located within the housing for providing a seal between the outer surface of the piston rod and the inner surface of the housing, the piston rod seal including a sealing disk to which is connected a reinforcement element, said reinforcement element functioning as a guide element that guides the piston rod during axial movement of the piston rod, the reinforcement element being a substantially U-shaped ring element possessing two axially extending legs that extend in the same direction, said two legs being spaced apart to define an interior of the reinforcement element located between the two legs, the sealing disk being located substantially entirely exteriorly of said interior of the reinforcement element.

2. The piston arrangement according to claim 1, wherein said two legs of said reinforcement element include one leg located radially inwardly of the other leg.

3. The piston arrangement according to claim 2, wherein said one leg of the ring element surrounds the piston rod with a small radial play.

4. The piston arrangement according to claim 2, wherein an inner surface of said one leg of the ring element is provided with a layer of friction-reducing material.

5. The piston arrangement according to claim 1, wherein an outer surface of the reinforcement element is provided with a layer of an elastomer material.

6. The piston arrangement according to claim 1, including a support piece positioned at one axial end of the sealing disk, and a bead provided on the inner surface of the housing for retaining the piston rod seal in place, the support piece being located between the bead and the sealing disk.

7. The piston arrangement according to claim 1, wherein the reinforcement element includes an open end that faces away from the sealing disk.

8. A piston arrangement comprising: a housing having a radially inwardly facing inner surface; an axially movable piston rod positioned within the housing; and a rod seal for providing a seal between the housing and the axially movable piston rod, the rod seal comprising a sealing disk having an outer surface and guiding means for guiding movement of the piston rod during axial movement of the piston rod within the housing, said guiding means being a reinforcement element that is connected to said sealing disk and arranged axially with respect to said sealing disk, the reinforcement element being a substantially z-shaped element having two axially extending legs that extend in opposite directions, one of the two legs being located radially inwardly of the other leg, and a portion of said sealing disk being located between a radially outwardly facing outer surface of said other leg and the inner surface of said housing.

9. The piston rod seal according to claim 8, wherein an inner surface of the one leg of the substantially z-shaped element is provided with a layer of friction-reducing material.

10. The piston rod seal according to claim 8, wherein an outer surface of the reinforcement element is provided with a layer of an elastomer material.

11. The piston rod seal according to claim 8, wherein the outer surface of the sealing disk is provided with a radially outwardly protruding sealing lip for engaging an inner surface of the housing when the piston rod seal is installed within the housing and a radially inwardly protruding sealing lip for engaging an outer surface of the piston rod when the pistol rod seal is mounted on the piston rod.

12. A piston rod seal for providing a seal between a housing and an axially movable piston rod positioned within the housing, comprising a sealing disk having an outer surface and guiding means for guiding movement of the piston rod during axial movement of the piston rod within the housing, said guiding means being a substantially U-shaped ring element possessing two axially extending legs that extend in the same direction, said two legs including one leg located radially inwardly of the other leg, said one leg having an inner surface provided with a layer of friction-reducing material, said two legs being spaced apart to define an interior of the ring element between the two legs, the sealing disk being located substantially entirely exteriorly of the interior of the ring element.

13. The piston rod seal according to claim 12, wherein the ring element includes an open end that faces away from the sealing disk.

14. A piston arrangement comprising:

a housing having an inner surface;

a piston rod positioned within the housing for axially moving within the housing, the piston rod having an axis and an outer surface; and a piston rod seal mounted in surrounding relation on the piston rod and located within the housing for providing a seal between the outer surface of the piston rod and the inner surface of the housing, the piston rod seal including a sealing disk to which is connected a reinforcement element, said reinforcement element functioning as a guide element that guides the piston rod during axial movement of the piston rod, the reinforcement element being a substantially z-shaped element having two axially extending legs that extend in opposite directions, one of the two legs being located radially inwardly of the other leg and extending exteriorly of the housing.

15. The piston arrangement according to claim 14, wherein an inner surface of the one leg of the substantially z-shaped element is provided with a layer of friction-reducing material.

* * * * *